(12) United States Patent
Yamane et al.

(10) Patent No.: US 9,676,307 B2
(45) Date of Patent: Jun. 13, 2017

(54) ADJUSTABLE ARMREST

(71) Applicant: Bizen Hatsujo Co., Ltd., Okayama (JP)

(72) Inventors: Takeshi Yamane, Okayama (JP);
Tokuzo Kobayashi, Okayama (JP);
Yoshinori Taniguchi, Okayama (JP);
Yasushi Taniguchi, Okayama (JP);
Kengo Tamura, Okayama (JP)

(73) Assignee: Bizen Hatsujo Co., Ltd., Okayama (JP)

( * ) Notice: Subject to any disclaimer, the term of this patent is extended or adjusted under 35 U.S.C. 154(b) by 30 days.

(21) Appl. No.: 14/811,029

(22) Filed: Jul. 28, 2015

(65) Prior Publication Data

US 2016/0022046 A1    Jan. 28, 2016

(30) Foreign Application Priority Data

Jul. 28, 2014 (JP) ................................. 2014-153204

(51) Int. Cl.
*B60N 2/46* (2006.01)

(52) U.S. Cl.
CPC ........... *B60N 2/464* (2013.01); *B60N 2/4606* (2013.01)

(58) Field of Classification Search
CPC ............................. B60N 2/464; B60N 2/4606
USPC .................................................... 297/411.32
See application file for complete search history.

(56) References Cited

U.S. PATENT DOCUMENTS

| | | | |
|---|---|---|---|
| 6,916,068 B2* | 7/2005 | Kitamura | A47C 1/03 297/411.32 X |
| 7,185,952 B1* | 3/2007 | Chen | B60N 2/4633 297/411.38 |
| 7,198,331 B2* | 4/2007 | Omori | B60N 2/4633 297/411.32 |
| 7,393,058 B2* | 7/2008 | Omori | B60N 2/4633 297/411.32 |
| 7,568,766 B2* | 8/2009 | Chen | B60N 2/4633 297/411.32 X |
| 7,611,205 B2* | 11/2009 | Chen | B60N 2/4606 297/411.32 X |
| 8,177,301 B2* | 5/2012 | Saito | A47C 7/543 297/411.32 |
| 8,480,177 B2* | 7/2013 | Kobayashi | B60N 2/4633 297/411.32 X |
| 8,777,317 B2* | 7/2014 | Saito | B60N 2/4633 297/411.32 X |

(Continued)

FOREIGN PATENT DOCUMENTS

JP    2007-185223 A    7/2007

*Primary Examiner* — Rodney B White
(74) *Attorney, Agent, or Firm* — Myers Wolin, LLC

(57) ABSTRACT

An armrest comprises an arm body in which a through hole is formed, an arm connected to the arm body, a drum that includes a cylinder inserted in the through hole, a bottom, and planar walls extending outside from a part of an end of the cylinder, is arranged rearward the arm body, and pivots the arm body about the cylinder; and mounting metal fittings that are integrally connected to the drum while locking the bottom and can be mounted on the seat frame. The armrest can adjust a position of the arm at a storage state and at a use state. The planar walls are arranged in such a manner as to position in a front-and-rear direction of the arm body in the use state, and the arm body is sandwiched between the planar walls and the mounting metal fittings in an axial direction of the cylinder.

6 Claims, 4 Drawing Sheets

(56) References Cited

U.S. PATENT DOCUMENTS

| | | | |
|---|---|---|---|
| 2002/0096928 A1* | 7/2002 | Bidare | B60N 2/4633 297/411.32 |
| 2002/0105217 A1* | 8/2002 | Khedira | B60N 2/4606 297/411.32 |
| 2007/0085404 A1* | 4/2007 | Chen | A47C 1/03 297/411.32 |
| 2009/0295212 A1* | 12/2009 | Yamane | B60N 2/4633 297/411.32 |

* cited by examiner

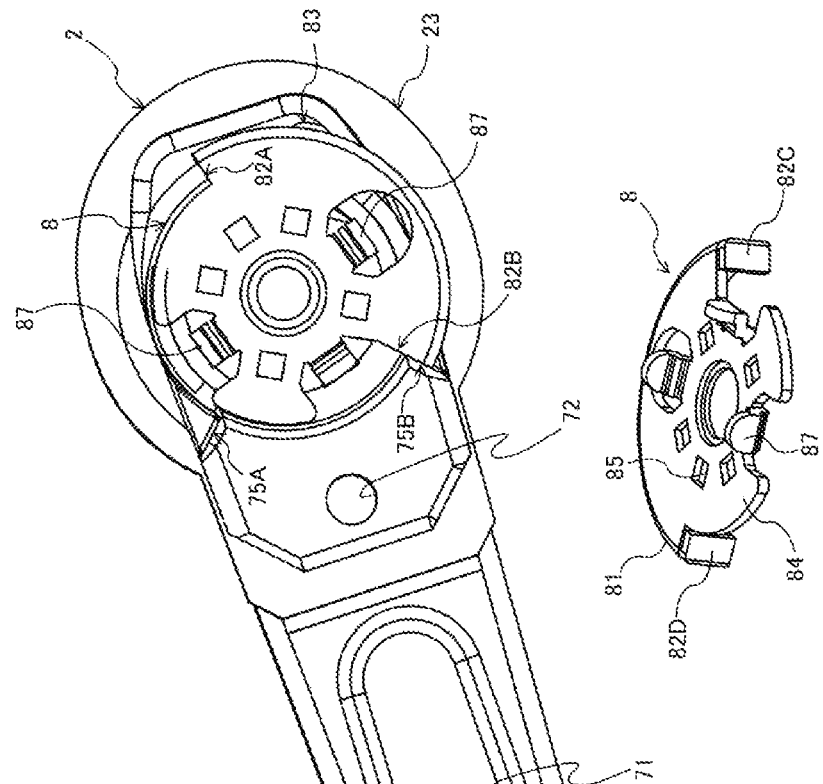
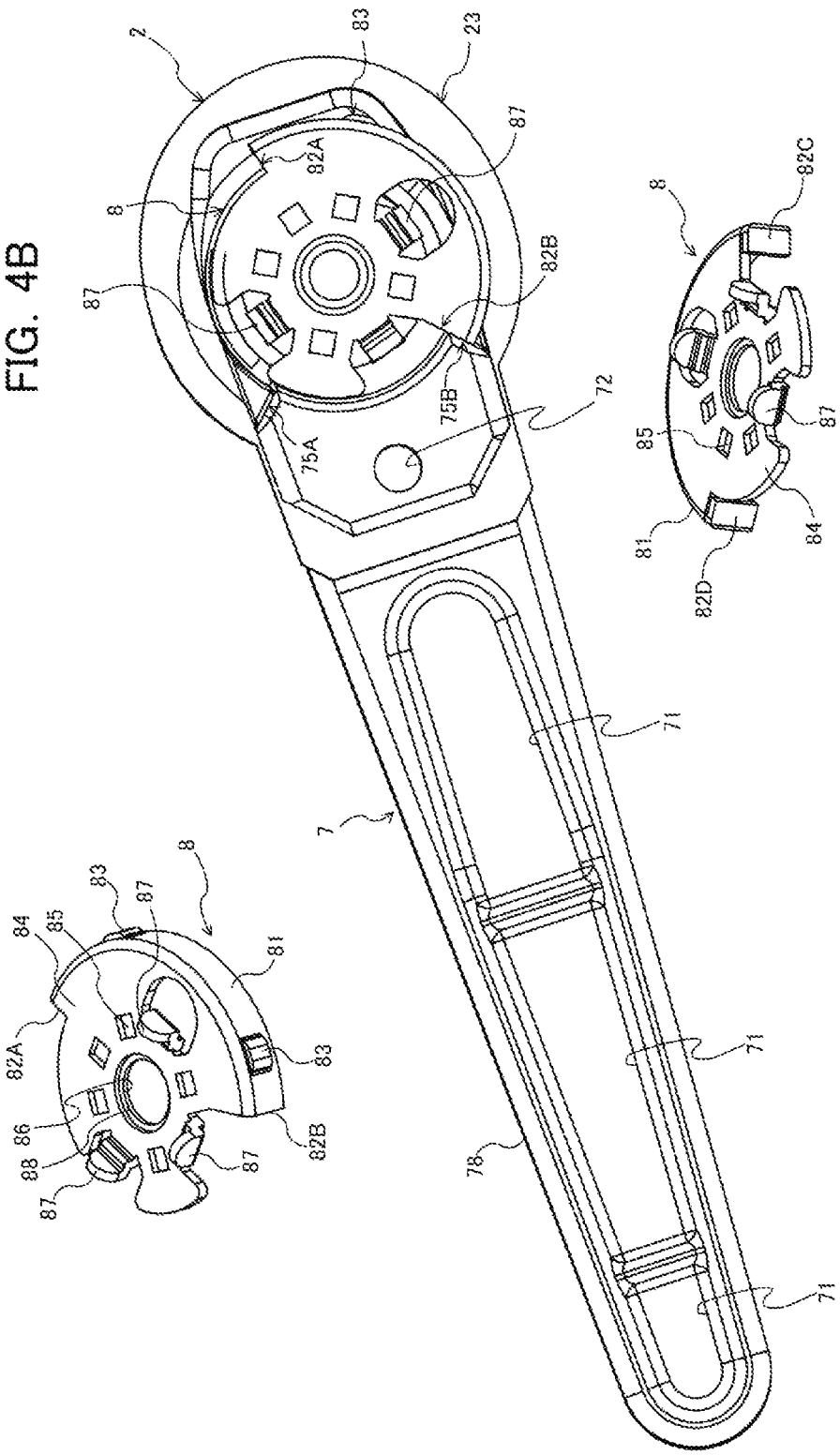

ADJUSTABLE ARMREST

CROSS-REFERENCE TO RELATED APPLICATION

This application claims the benefit of Japanese Patent Application No. 2014-153204, filed on Jul. 28, 2014, the entire disclosure of which is incorporated by reference herein.

FIELD

This application relates to an armrest.

BACKGROUND

An armrest is used to be mounted on a seat frame of a vehicle, such as automobile. When the armrest is not in use, an arm is pushed upward to be stored beside a backrest of a seat, and when in use, the arm is pushed forward with respect to the seat to a substantially horizontal position.

Unexamined Japanese Patent Application Kokai Publication No. 2007-185223 discloses an armrest including a drum mounted on a seat frame, and an arm having a through hole into which the drum is inserted.

The arm is made of a metal plate having a thickness of 1.6 mm, and has, at an opening of the through hole, an annular ring formed by folding the metal plate. The drum comprises a body formed to have an outer diameter substantially identical to an outer diameter of the ring, and a head formed to have an outer diameter substantially identical to an inner diameter of the ring. In the armrest, the head of the drum is inserted in to the ring, and the arm pivots about the drum.

SUMMARY

Problem to be Solved by the Invention

In the armrest, during use in which the arm is pushed at a substantially horizontal position, a human arm of a seated person is placed on the arm, and the arm restricts a horizontal movement of a human body. Consequently, a load is applied to the arm in a longitudinal direction (vertical direction) and a lateral direction (horizontal direction). When a lateral load is applied to the arm, a connection portion of the body and the head of the drum comes into contact with an end surface of the ring so that the load is applied to the ring. The ring contacts the drum by a limited area that has a diameter identical to a diameter of the drum and is composed of a metal plate end surface. Thus, the strength of the armrest in the lateral direction is insufficient.

To improve the strength of the armrest in the lateral direction, thickening the ring by thickening the metal plate is assumed. However, in this case, a weight of the armrest increases. Alternatively, enlarging the end surface of the ring by enlarging the diameter of the drum is assumed. However, in this case, the armrest is enlarged.

The present disclosure has been made in view of the above situation, and an objective of the disclosure is to provide an armrest having a reinforced strength against a lateral force and a reduced weight and size.

Means for Solving the Problem

The armrest according to the present disclosure is an armrest that is used while being fixed on a seat frame through a fastening bolt, the armrest comprising:

an arm body in which a first through hole is formed;
an arm connected to the arm body;
a drum that includes a cylinder inserted in the first through hole, a bottom, and circular arc planar walls extending outside from a part of an end of the cylinder, is arranged rearward the arm body, and pivots the arm body about the cylinder;
mounting metal fittings that are integrally connected to the drum while locking the bottom and can be mounted on the seat frame; and
an adjustment mechanism for adjusting a position of the arm at a storage state in which a front of the arm has pivoted upward and at a use state in which the front of the arm has pivoted downward,
wherein the planar walls each have an outer diameter having a size of 10% or more of a length of the arm and a width three times or more as large as a plate thickness of the drum, the planar walls are arranged in such a manner as to position in a front-and-rear direction of the arm body in the use state, and the arm body is sandwiched between the planar walls and the mounting metal fittings in an axial direction of the cylinder.

It is preferable that, in the bottom, a second through hole into which the fastening bolt fastened with the seat frame can be inserted, a raised ring that is raised toward the mounting metal fittings, and locks that surround the raised ring are formed,
in the mounting metal fittings, a raised ring insertion hole into which the raised ring is inserted is formed, and, on one surface, locked portions that fit in the corresponding lock are formed, and, on the other surface, folded claws each having a tip end that is folded are formed,
with respect to the drum, while the locks and the locked portions are locked one-to-one into each other, and the raised ring is inserted in the raised ring insertion hole, a tip end of the raised ring is folded outside the raised ring insertion hole and an outer diameter of the tip end is spread out further than the raised ring insertion hole so that the drum is integrally connected to the mounting metal fittings, and
with respect to the mounting metal fittings, the folded claws lock into corresponding insertions holes provided in the seat frame and the fastening bolt inserted in the second through hole is fastened so that the mounting metal fittings can be mounted on the seat frame.

It is preferable that the adjustment mechanism is a spring lock mechanism comprising:
the drum that includes a rewind cam and a restoration cam for a coil spring and is mounted on the seat frame through the mounting metal fittings;
the arm that integrally connects the arm body and integrally pivots about the drum while fixing the coil spring;
the coil spring that includes a fixed end folded outside and a free end folded inside, wherein the fixed end is fixed to the arm, and an inner diameter is smaller than a diameter of the drum in a free state in which the coil spring is wound around the drum; and
the arm body that includes a lock wall and a lock auxiliary cam for the coil spring, is inserted with the coil spring, and is integrally connected to the arm, the spring lock mechanism regulating downward pivot of the arm while allowing upward pivot of the arm, and
the adjustment mechanism is a height adjustment mechanism,
wherein, when the arm pivots upward from the use state to an upper limit position within an adjustment range, the free end of the coil spring comes into contact with the rewind cam of the drum to loosen fastening of the coil spring, and then the free end of the coil spring comes into contact with the lock auxiliary cam of the arm body, and moves to the lock wall to be locked so that a lock release state in which vertical pivot of the arm can be freely performed is enabled, and when the arm pivots downward out of the lock release state to a lower limit position within the adjustment range, the free end of the coil spring comes into contact with the restoration cam to be released from the lock wall so that a lock state in which vertical pivot of the arm is regulated is restored.

It is preferable that the cylinder includes a chipped portion formed in a cylindrical cross section thereof.

It is preferable that the armrest further comprises a cover that covers the arm body, a base of the arm, and the mounting metal fittings, wherein the mounting metal fittings include a plate that is locked into the bottom of the drum, a circular arc stand wall formed on an outer rim of the plate, and a protuberance that is formed on an outer wall surface of the stand wall, the cover includes a circular arc raised wall that is raised from a portion covering the planar walls and extends toward an outer wall side of the stand wall of the mounting metal fittings to contact the protuberance, and when the arm body pivots about the cylinder, the protuberance and the raised wall brake the pivot and prevent deflection, rattling, or downward fall of the arm body.

It is preferable that the mounting metal fittings include a plate that is locked into the bottom of the drum, a circular arc stand wall formed on an outer rim of the plate, and planar stopper contact portions connected to the plate, and the arm body and the arm are integral.

Effects of the Invention

According to the present disclosure, an armrest having a reinforced strength against a lateral force and a reduced weight and size can be provided.

BRIEF DESCRIPTION OF THE DRAWINGS

A more complete understanding of this application can be obtained when the following detailed description is considered in conjunction with the following drawings, in which:

FIG. 4A is a perspective view of mounting metal fittings;

FIG. 4B is a side view of an arm mounted with the mounting metal fittings; and

FIG. 4C is a perspective view of the mounting metal fittings having planar stopper contact portions.

DETAILED DESCRIPTION

Embodiments for Carrying Out the Invention

Figure 1:
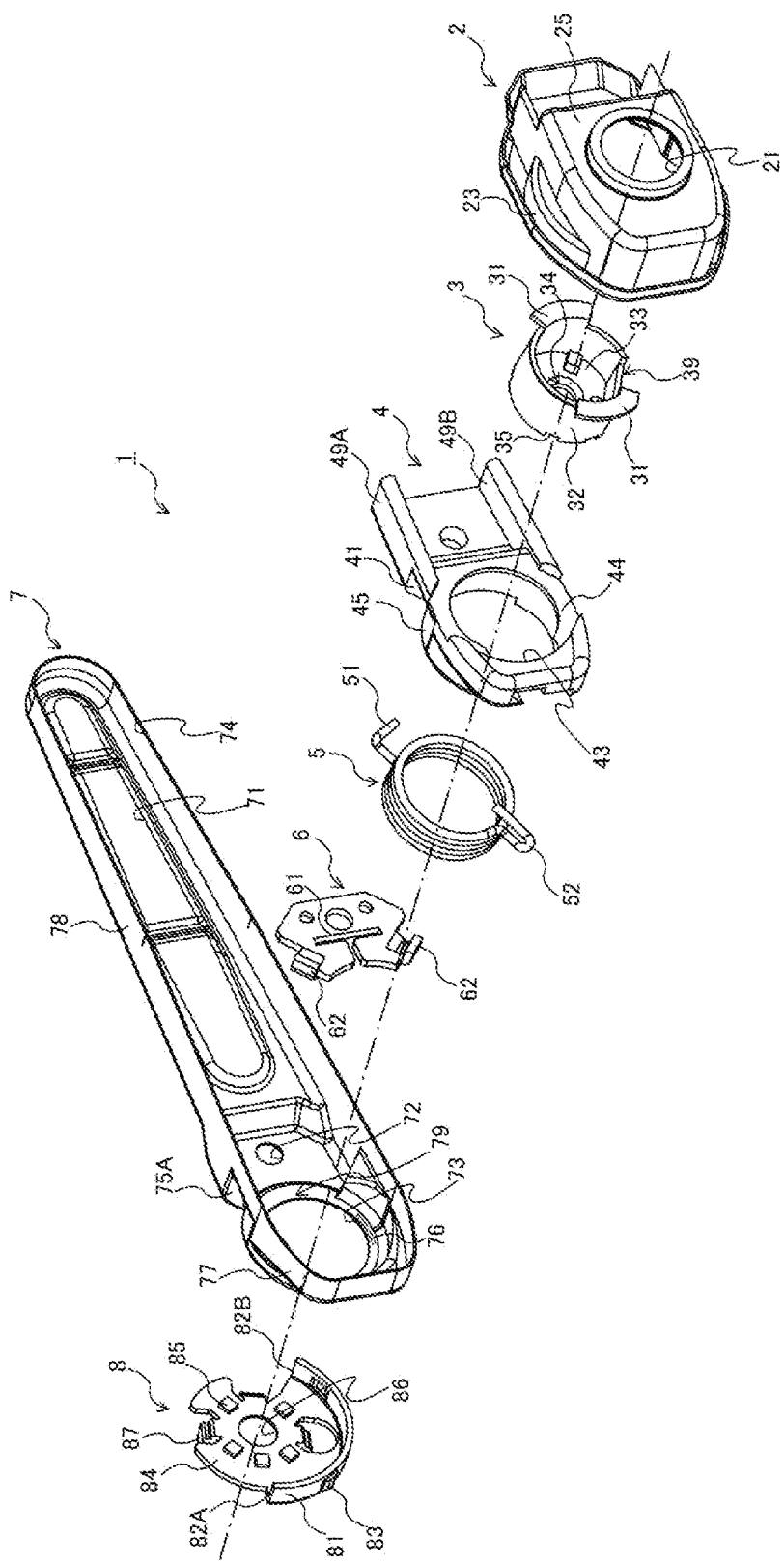
FIG. 1 is an exploded perspective view of an armrest according to an embodiment of the present disclosure.

Hereinafter, an armrest according to embodiments of the present disclosure will be described in detail with reference to the accompanying drawings. Note that the same or equivalent components in the drawings are denoted by the same reference numerals. In FIG. 1, a left-right direction and an up-down direction of an arm 7, and a back side of the arm 7 respectively corresponds to a horizontal direction and a vertical direction, and a front direction that are referred to in this description.

In the present embodiments, a configuration of the armrest will be described through a stepless height adjustment type armrest illustrated in FIGS. 1-4 as an example. In this stepless height adjustment type armrest 1 (hereinafter simply referred to as armrest 1), a coil spring 5 is wound around a drum 3 corresponding to a pivot shaft of the arm 7. The armrest 1 includes a spring lock mechanism for locking slippage of the drum 3 by a fastening force of the coil spring 5. In the armrest 1, a state in which the arm 7 is made to stand is a storage state, and a state in which the arm 7 is pushed down is a use state. A range within which the arm 7 pivots (hereinafter referred to as operation range of the arm 7) contains an adjustment range of the arm 7 having an adjustable height. Herein, the adjustment range of the arm 7 refers to a range from a lower limit position of the arm 7 to a height adjustment upper limit position at an angle 40° upward relative to the lower limit position. Note that the operation range of the arm 7 is ordinarily set to be approximately 100-120°. The armrest 1 according to the present embodiments is an armrest for right arm. The entire length of the armrest 1 (from the center of pivot to an end) is 200-300 mm.

As illustrated in FIG. 1, the armrest 1 comprises a resin cover 2, the drum 3, an arm body 4, mounting metal fittings 8, the arm 7, and the coil spring 5. A holder plate 6 for fixture on the arm 7 is attached to the coil spring 5. These members will be described one by one below.

Figure 2A:
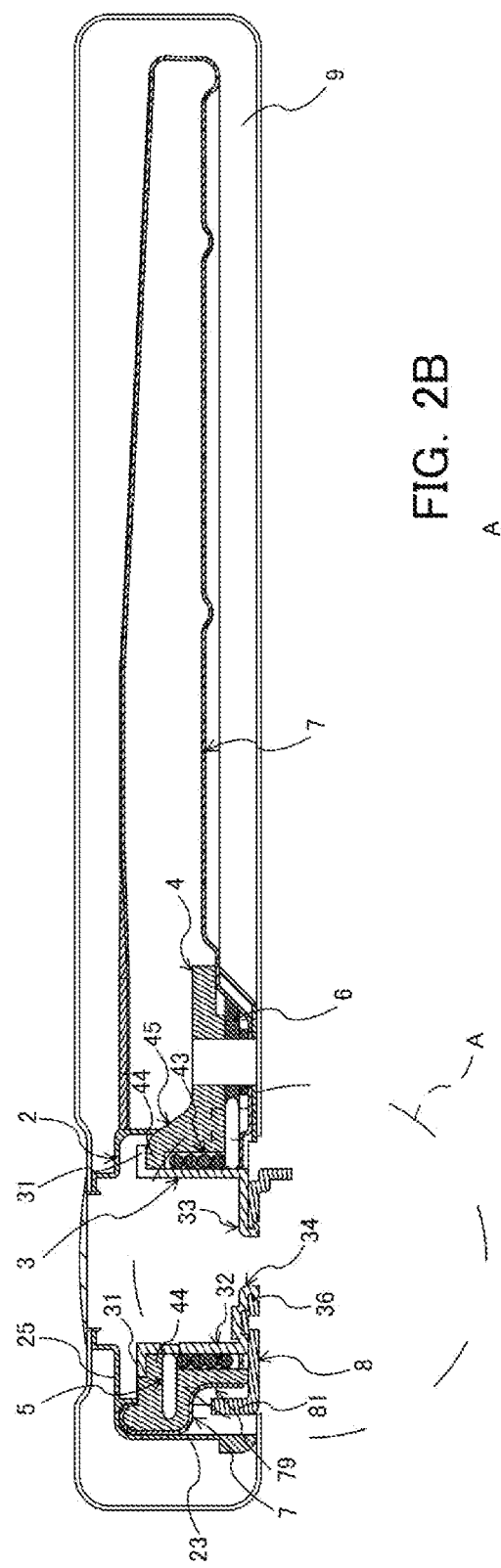
FIG. 2A is a cross-sectional view of the armrest.

The resin cover 2 is a member for preventing a finger of a seated person from being caught in a pivot mechanism of the armrest 1, and preventing a foam solution of a cushion member from leaking into the pivot mechanism when the foam solution is injected. The resin cover 2 covers a base 77 of the arm 7, the arm body 4, and the mounting metal fittings 8. The resin cover 2 comprises a flange cover 25 that covers a base 45 of the arm body 4 and planar walls 31 of the drum 3, and a raised wall 23 that is raised from the flange cover 25 and extends to a side surface of the mounting metal fittings 8. In the flange cover 25, a through hole 21 into which a mounting bolt (fastening bolt) for fixing the armrest 1 on a seat frame is inserted is formed. Moreover, on the raised wall 23, a circular arc wall surface is formed, and, as illustrated in FIG. 2A, this wall surface extends in such a manner as to cover a wall surface of a below-described stand wall 81 of the mounting metal fittings 8.

The drum 3 is a member that pivotably supports the arm body 4. In the present embodiments, the drum 3 is formed by press molding a steel plate. The drum 3 is a cylinder having a bottom. As illustrated in FIG. 1, the drum 3 comprises the planar walls 31, a cylinder 32, and a bottom 33.

The planar walls 31 are each a member called flange. The planar walls 31 each extend outward from a part of an end of the cylinder 32, and have a circular arc plane that is substantially orthogonal to a cylinder shaft of the drum 3. An outer diameter of a circular arc of each planar wall 31 is formed to be greater than an outer diameter of the cylinder 32. In the present embodiments, the outer diameter (length in a radial direction) of each planar wall 31 is approximately 25 mm, and a length of an external form thereof is 12.5% of a length of the arm of approximately 200 mm. A location of each planar wall 31 to which a load is applied is, in terms of the principles of the lever, more advantageous as more distant from the mounting bolt for fixing the armrest 1. Thus, the outer diameter of each planar wall 31 is preferably 10% or more of the length of the armrest 1. Moreover, the planar walls 31 (width in a circular arc direction) are each formed to have a width three times as large as a plate thickness (2 mm), and, in comparison with a conventional armrest, an area of each planar wall 31 is greatly enlarged. As illustrated in FIG. 2A, while the cylinder 32 is inserted in a through hole 43 of the arm body 4, the planar walls 31 contact a rim 44 of the through hole 43 at more distant locations in comparison with the conventional armrest. Moreover, the planar walls 31 and the rim 44 of the through hole 43 contact each other in a larger area in comparison with the conventional armrest.

For example, in the conventional armrest of Unexamined Japanese Patent Application Kokai Publication No. 2007-185223, provided that a load of 980 N is applied to a location 200 mm longitudinally distant from the center of a ring having a diameter of 45 mm, a load of 980 N×200/(45/2) =8711 N, in terms of the principles of the lever, is applied to a semi-circumference portion of the ring. On the other hand, in the armrest 1 in the present embodiments, when the planar walls 31 and the cylinder 32 are formed to have an external size of 60 mm and 40 mm (diameter of 50 mm), respectively, provided that a load of 980 N is applied to the arm 7, a load of 980 N×200/(50/2)=7840 N is applied to a tip end of each planar wall 31. This is a 10% less force than the force applied to the conventional armrest.

As described above, in the present embodiments, the planar walls 31 are each formed to have the large width three times as large as the plate thickness. When the load of 7840 N applied to each planar wall 31 as described above is applied to the arm body 4 made of resin that has a compressive strength of 60 N/mm$^2$, a required area to which the load is applied in the case of a safety ratio of 1.2 is 7840/60×1.2=157 mm$^2$ When the circular arc of each planar wall 31 has a diameter of 50 mm and the circular arc thereof is of 60° of the circumference, a length of the circular arc in each planar wall 31 is (50×π)×(60/360)=26 mm. When the load as described above is applied to this circular arc, a width required for enabling the area of 157 mm$^2$ to which the load is applied is 157/26=6.0 mm. If the drum has the plate thickness of 2 mm, the width three times as large as the plate thickness is required. Note that a load applied to each planar wall 31 is in inverse proportion to the diameter thereof, and the required width of each planar wall 31 increases or decreases inversely as a range to which the load is applied (for example, a range of 60°).

In the armrest 1, the drum 3 ordinarily has the plate thickness of more than 2 mm. For example, to thin the drum 3 to 2 mm, the planar walls 31 each require the large width three times or more as large as the plate thickness. The planar walls 31 of the present embodiments each satisfy this condition, and each have a sufficient area to which a load is applied. Note that a location (portion) of each planar wall 31 to which a load is applied is, in terms of the principles of the lever, more advantageous as more distant from the mounting bolt for fixing the above armrest 1. Thus, the location of each planar wall 31 to which a load is applied preferably falls within a range of 60° forward to 60° backward relative to a shaft of the mounting bolt. Note that shortening the outer diameter of the cylinder 32 of the drum can also enlarge the area of each planar wall 31.

As illustrated in FIG. 1, while the arm 7 faces front, the planar walls 31 are each positioned in the front and rear relative to a shaft of the cylinder 32 of the drum 3. In other words, the planar walls 31 are aligned in a longitudinal direction of the arm 7. The planar walls 31 are formed at two positions in the front and rear relative to the cylinder 32 outside the cylinder 32. Thereby, increase in weight caused by providing each planar wall 31 can be suppressed to the minimum.

Note that the planar walls 31 are not limited to such a configuration as to be formed at two positions separate from each other in the front and rear. For example, the planar walls 31 may be formed at one position. The planar walls 31 may be formed along a substantially entire circumference of the cylinder 32 of the drum in such a manner as to include front and rear positions in the longitudinal direction of the arm 7 while the arm 7 faces front. However, if a range in which the planar walls 31 are disposed is larger than that required, a weight of the drum 3 increases. Thus, the planar walls 31 are each designed to have an appropriate size in consideration of strength.

Figure 2B:
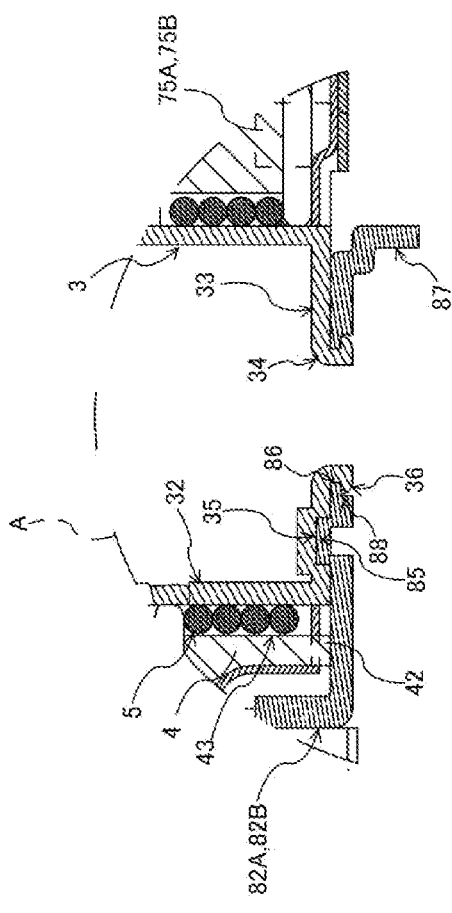
FIG. 2B is an enlarged view of a range surrounded by broken lines A illustrated in FIG. 2A.

The cylinder 32 is inserted in the through hole 43 of the arm body 4 while the coil spring 5 is wound around (see FIGS. 2A, 2B). Moreover, on the cylinder 32, a chipped portion 39 that is a portion depressed of a cross-sectional complete circle is formed. Note that the diameter of the cylinder 32 is set to correspond to a lock force (also called spring brake force) of the armrest to be set, and is ordinarily approximately 30-50 mm.

Figure 3A:
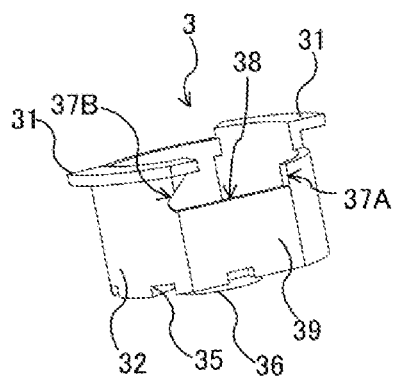
FIG. 3A is a perspective view of a drum.

The chipped portion 39 is formed to enable the coil spring 5 to be mounted. During assemblage of the armrest 1, the cylinder 32 is inserted into the coil spring 5, thereby mounting the coil spring 5. The chipped portion 39 is formed to have such a sufficient width and depth (the depth is a distance from a circumference of the above cross-sectional complete circle to a bottom of the chipped portion 39) as not to be interfered by a tip end of a free end 52 of the coil spring 5 when inserted into the coil spring 5. Thereby, the chipped portion 39 enables the coil spring 5 to be mounted. As illustrated in FIG. 3A, the chipped portion 39 is disposed at a position that fails to overlap with positions of a rewind cam 37A and a restoration cam 37B, as described below, that are provided in a cut-out section 38. Note that, in the present embodiments, one chipped portion 39 is formed, but the plural chipped portions 39 may be formed. In this case, at least one chipped portion 39 may enable the coil spring 5 to be mounted.

Figure 3C:
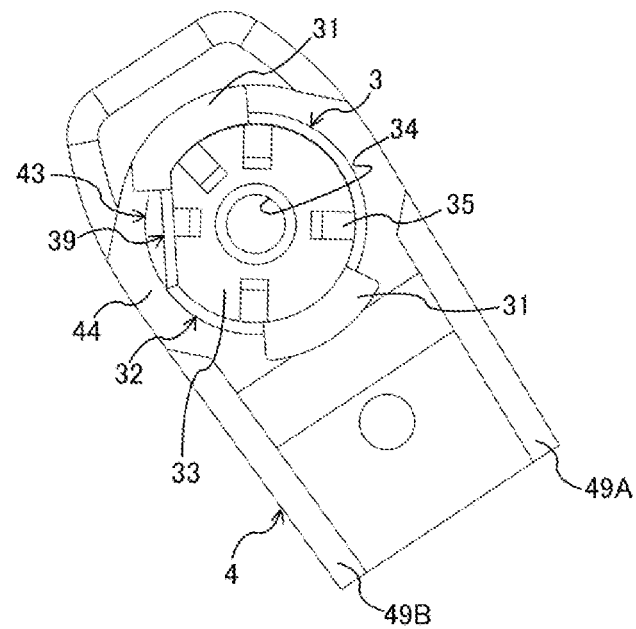
FIG. 3C is a top view of the arm body mounted with the drum.
Figure 3B:
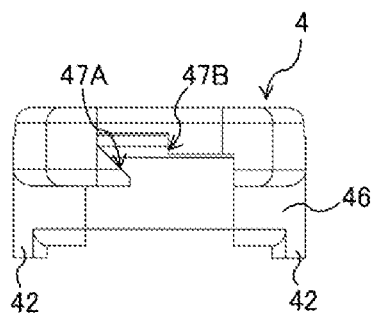
FIG. 3B is a side view of an arm body.

Moreover, in the chipped portion 39, while the armrest 1 is assembled, a non-contact portion in which the cylinder 32 of the drum and an internal circumference of the coil spring 5 fail to contact each other is formed, and a boundary portion is formed between this non-contact portion and a complete circular portion of the cylinder 32 (that is, a portion in contact with the coil spring 5). This boundary portion causes increase in frictional resistance relative to the coil spring 5. Thus, when the chipped portion 39 is provided at a plurality of positions, and the boundary has an angular shape, further increase in frictional resistance can be expected. Note that, in view of situations, such as maintenance of the strength of the drum 3, the chipped portion 39 occupies preferably less than 30% of the circumference of the cylinder 32. In an embodiment as illustrated in FIG. 3C, the chipped portion 39 is formed to be in a range of approximately 60° relative to the shaft of the cylinder 32, and is formed at only one part of the cylinder 32.

As illustrated in FIG. 3A, in the cylinder 32, the cut-out section 38 in which a part of the circumference of an end thereof (side wall) is cut out in such a manner as to correspond to the range in which the arm 7 pivots (the range of approximately 100-120° as described above) is formed. Moreover, the cut-out section 38 is disposed in the chipped portion 39 as described above. The cut-out section 38 is provided with the rewind cam 37A at a position corresponding to the height adjustment upper limit position of the arm 7, and is provided with the restoration cam 37B at a position corresponding to the height adjustment lower limit position of the arm 7. The restoration cam 37B and the rewind cam 37A play a role of switching ON-OFF of the spring lock mechanism together with a lock auxiliary cam 47A and a lock wall 47B of the arm body 4.

At the bottom 33, a through hole 34, as illustrated in FIG. 1, into which the mounting bolt (for example, a bolt having a screw diameter of 10 mm) for fixing the armrest 1 on the seat frame is inserted, a plurality of recessions 35 that engage corresponding projections 85 of the mounting metal fittings 8 to function as rotation stop key, and a raised ring 36, as illustrated in FIG. 2B, that is raised from an outer surface of the bottom 33 and surrounds an external circumference of the through hole 34. The recessions 35 engages the projections 85 of the mounting metal fittings 8 to prevent rotation of the bottom 33 relative to the mounting metal fittings 8. The raised ring 36 is inserted in a through hole 86 of the mounting metal fittings 8. The raised ring 36 has a tip end that is stretched out, thereby being hooked on a step 88 of the through hole 86 of the mounting metal fittings 8. Thereby, the bottom 33 is fixed on the mounting metal fittings 8. The raised ring 36 integrally connects the drum 3 to the mounting metal fittings 8. The arm body 4 is sandwiched between the mounting metal fittings 8 and the planar walls 31 to be thereby held.

As illustrated in FIG. 1, the arm body 4 includes the base 45, banks 49A, 49B that extend in the longitudinal direction, and two internal stoppers 41 formed between the base 45 and the corresponding banks 49A, 49B. The arm body 4 is fitted in the arm 7 and an end 74 of the base 77 is caulked (folded back) (unillustrated) so that the arm body 4 is integrally connected to the arm 7. As illustrated in FIGS. 2A, 2B, the base 45 includes the through hole 43 having the rim 44. The cylinder 32 of the drum 3 around which the coil spring 5 is wound is inserted into the through hole 43, and the base 45 thereby pivotably holds the cylinder 32. A surface of the rim 44 is plane, and this surface comes into surface contact with the planar walls 31 of the drum 3. Thereby, the rim 44 regulates a horizontal position of the drum 3 and receives a load.

In the arm body 4, a substantially cylindrical wall 46 and protrusions 42 having such a shape as to protrude from an tip end thereof are formed. Two protrusions 42 are provided on the wall 46. As illustrated in FIG. 2B, the protrusions 42 are inserted into corresponding arm body insertion holes 76. Tip ends of the protrusions 42 protrude from the arm 7 to a side of the mounting metal fittings 8 and contact the mounting metal fittings 8. The tip ends of the protrusions 42 form a space between the arm 7 and the mounting metal fittings 8. Thereby, even when the armrest 1 includes the arm 7 made of metal, the arm 7 and the mounting metal fittings 8 fail to directly contact each other. Consequently, applying a grease is unnecessary.

When the arm body 4 is fitted inside the arm 7, the internal stoppers 41 support external stoppers 75A, 75B from an inner side of the arm 7 by a large plane. On the other hand, the two banks 49A, 49B are formed into a substantially rectangular prism shape, and are each disposed at an end of the arm 7 in a short-side direction, that is, each disposed in such a manner as to contact the end 74 having a wall-surface shape. The banks 49A, 49B allow a flexural strength of the arm 7 in the longitudinal direction to be improved.

Referring to FIG. 1 again, an inner diameter of the coil spring 5 in a natural state is slightly smaller than the outer diameter of the cylinder 32 of the drum 3, and the coil spring 5 is wound around the cylinder 32 of the drum 3 to comprise, together with the drum 3, the spring lock mechanism. In this case, in the coil spring 5, for example, when the diameter of the drum 3 is 25 mm, and a distance between a location on which a load of the arm 7 is applied and the center of the mounting bolt is 200 mm, provided that a load of 980 N is applied to a tip end of the arm 7, a fixed end 51 of the coil spring 5 is strained by a force magnified eight times (in terms of moment calculation, P=980×200/25=7840 N). Since the fixed end 51 is strained by such a force, in a conventional fixing element as indicated in Unexamined Japanese Patent Application Kokai Publication No. 2007-185223, a coil spring having an L-shaped fixed end is once wound around a raised ring of the arm so that a part of a tensile force is offset. Then, the coil spring is wound around the raised ring so as to be fixed with the arm. Note that the clockwise or counterclockwise coil spring 5 that pivots downward to produce a lock force is selected depending on whether the armrest 1 is disposed on either a left or right side relative to a seat back.

As the coil spring 5, a coil spring having such a direction of spiral (clockwise or counterclockwise) as to loosen the fastening of the cylinder 32 when the arm 7 is made to pivot upward about the cylinder 32, and further allow the coil to be wound when the arm 7 is made to pivot downward is selected. The coil spring 5 comprises the fixed end 51 that is fixed to the arm 7 through the holder plate 6 as illustrated in FIG. 1, and the free end 52.

The fixed end 51 is folded into a Z-shape. On the other hand, the free end 52 has a U-shape in which folding is once performed outward relative to the coil, and then folding-back is performed toward a center side of the coil. The tip end of the free end 52 is disposed between the rewind cam 37A and the restoration cam 37B of the drum 3 that are positioned inside the coil, and extends across an inner wall of the cylinder 32 to an inner side of the cylinder 32. Moreover, a folded-back portion having a U-shape is disposed between the lock auxiliary cam 47A and the lock wall 47B of the arm body 4.

The holder plate 6 is made of a steel plate and formed into such a shape as to include a T-shaped groove 61 and a reinforcement end 62 arranged at an end portion. The holder plate 6 is fitted in the base 77 of the arm 7 so as to be fixed to the arm 7. For the purpose of common use of components, the T-shaped groove 61 is formed into a T-shape that allows either the counterclockwise or clockwise coil spring 5 to be fitted. A groove width of the T-shaped groove 61 is substantially identical to a wire diameter of the coil spring 5. The Z-shaped fixed end 51 of the coil spring 5 is fitted in the T-shaped groove 61 so that the fixed end 51 of the coil spring 5 is tightly fixed. Note that the T-shaped groove 61 may be formed into a shape identical to a shape of the fixed end 51 (for example, L-shape). Meanwhile, the reinforcement end 62 reinforces the external stopper 75A of the arm 7.

The arm 7 is press molded to have a concave cross-section (U-shaped cross section). As described above, the arm 7 is integrally connected to the arm body 4 by folding back the end 74. Thereby, the section modulus, the strength, and the safety of the arm 7 is enhanced (see FIG. 4). As illustrated in FIG. 1, the arm 7 includes the base 77, the external stoppers 75A, 75B, and an arm portion 78. Note that FIG. 1 illustrates the arm 7 before the end 74 is folded back.

In the base 77, a cylindrical projection 79 is formed. The projection 79 projects on a side opposite to the end 74. A tip end of the projection 79 is on a surface facing the mounting metal fittings 8, and, in the tip of the projection 79, the arm body insertion holes 76 into which the protrusions 42 of the arm body 4 are inserted are formed. A side wall of the projection 79 includes recesses, and wall portions of these recesses are configured to be the corresponding external stoppers 75A, 75B. When the arm 7 pivots to the upper limit position or the lower limit position within the operation range, the external stoppers 75A, 75B come into contact with stopper contact portions 82A, 82B of the mounting metal fittings 8 to regulate the pivot.

In the arm portion 78, a round hole 73, an injection hole 72, and a long hole 71 are formed in this order from the base 77 in the longitudinal direction. These holes penetrate the arm 7 in the left-right direction of the arm 7. The injection hole 72 is a hole into which an undiluted solution of a foamed resin 9 of the cushion member is injected during manufacture of the armrest 1. The round hole 73 is a hole into which the cylinder 32 of the drum 3 is inserted. The long hole 71 is a hole that reduces a weight of the arm 7. The foamed resin 9 spreads in the left-right direction through the long hole 71, thereby preventing the foamed resin 9 from releasing from the arm 7. The foamed resin 9 functions as cushion member, and a surface of the foamed resin is covered with a skin.

As illustrated in FIGS. 4A, 4B, the mounting metal fittings 8 comprises a plate 84 having a circular arc portion, a stand wall 81 arranged along the circular arc portion of the plate 84, and the stopper contact portions 82A, 82B including a part of the circular portion and both ends of the stand wall 81. Note that FIG. 4C illustrates an embodiment of the mounting metal fittings 8 including planar stopper contact portions 82C, 82D.

At the center of the plate 84, a through hole 86 is formed. A plurality of projections 85 are formed in such a manner as to surround the through hole 86, and further outside the same, folded claws 87 are formed. Along the through hole 86, a step 88 is formed, and a tip end of the raised ring 36 of the drum that is inserted in the through hole 86 is spread out outside to be hooked by the step 88 so that the step 88 functions as retainer of the tip end of the raised ring 36. The mounting bolt is inserted into the through hole 86, and the armrest 1 is fixed on the seat frame through this mounting bolt. A plurality of projections 85 (five projections illustrated in the drawings) are arranged on a side in contact with the drum 3, the projections 85 fit into the recessions 35 at the bottom 33 of the drum 3 so that the drum 3 and the mounting metal fittings 8 are tightly integrated with each other. Thereby, thinning a combination of the drum 3 and the mounting metal fittings 8 is designed. Moreover, the folded claws 87 are folded in two steps. Specifically, the folded claws 87 are folded substantially in the vertical direction, then folded substantially in parallel to the plate 84, and further folded substantially in the vertical direction. Three folded claws 87 are formed, and each is inserted in a corresponding hole formed in a mounting bracket (unillustrated) of the seat frame. Thereby, the armrest 1 is mounted on the seat frame. In comparison with one step claw folded substantially in the vertical direction from the plate 84, the folded claws 87 allow an area in contact with the mounting bracket to increase and both members on a seat frame side and the mounting metal fittings 8 to be thinned.

On an outer wall of the stand wall 81, a protuberance 83 is formed. This protuberance 83 protrudes to such a position as to come into contact with an inner wall surface of the raised wall 23 of the resin cover 2, and causes friction relative to the inner wall surface of the raised wall 23 when the arm 7 pivots. Thereby, the pivot of the arm 7 can be braked. Moreover, deflection, rattling, or fall of the arm 7 while the spring lock mechanism is in a lock release state are prevented.

At both the ends of the stand wall 81, the stopper contact portions 82A, 82B are provided. When the arm 7 pivots to a predetermined position (storage position or operation lower limit position), the stopper contact portions 82A, 82B contact the external stoppers 75A, 75B of the arm 7 by a sufficient area, thereby preventing pivot of the arm 7. Note that the stand wall 81 is arranged to improve the strength of the mounting metal fittings 8 and increase an area in contact with the arm 7. In an embodiment illustrated in FIG. 4C, a contact portion has the stand wall 81 made of a planar steel plate, and in the case of this embodiment, an area of the planar steel plate may allow the arm 7 made of a steel plate to be reduced.

Next, operations of the armrest 1 will be described. The armrest 1 is used while being fixed on the seat frame. When not in use, the armrest 1 is configured to be able to be stored at a storage position. At this storage position, the internal stopper 41 and the external stopper 75A and the stopper contact portion 82A of the mounting metal fittings 8 contact each other, thereby restricting backward pivot of the arm 7. At this time, the free end 52 of the coil spring 5 is locked by the lock wall 47B, and the coil spring 5 has been rewound (this state is referred to as lock release state).

When the armrest 1 is in use, a seated person pivots the arm 7 from the storage position nearly to the lower limit position. The free end 52 of the coil spring 5 moves along a slanted surface of the restoration cam 37B, and is released from the lock wall 47B. The coil spring 5 fastens the cylinder 32 of the drum 3, and the armrest 1 is in a state in which downward pivot of the arm 7 is stopped (this state is referred to as lock state). In this state, when the arm 7 pivots upward, the coil spring 5 loosens the cylinder 32 of the drum 3. Consequently, the arm 7 can pivot upward. A seated person pivots the arm 7 upward to a desired position, and in this state, the armrest 1 is used. Note that, if the arm 7 of the armrest 1 that has been restored to the lock state is made to pivot further slightly downward, the external stopper 75B comes into contact with the stopper contact portion 82B, thereby completely restricting downward pivot of the arm 7. This position is the lower limit position of the arm 7.

When a vehicle runs on a tortuous road, the body of a seated person inclines, and accordingly a large horizontal load applies to the armrest 1. This load applies to a base in the vicinity of the mounting bolt as a force for inclining the tip end of the arm 7 in an obliquely horizontal direction. In the present embodiments, the planar walls 31 of the drum 3 and the plate 84 of the mounting metal fittings 8 sandwich the arm body 4, and the mounting metal fittings 8 are fixed on the seat frame by a mounting bolt having a diameter of approximately 10 mm. Moreover, the planar walls 31 of the drum 3 each have a length in a radial direction of the circular arc that is 10% or more of the length of the arm 7, and a width in the circular arc direction thereof that is three times or more as large as the plate thickness. Consequently, the arm 7 never inclines in the horizontal direction, but strongly maintains to be in a constant direction.

When the arm 7 is made to pivot upward to the upper limit position of the adjustment range of the arm 7, the free end 52 of the coil spring 5 comes into contact with the rewind cam 37A. Thereby, the coil spring 5 is rewound. The free end 52 moves along a slanted surface of the lock auxiliary cam 47A, and the free end 52 is locked by the lock wall 47B. Thereby, the armrest 1 is in the lock release state, and the arm 7 can pivot both upward and downward. In this state, the arm 7 is made to pivot to the upward storage position so as to be stored. In this state, the arm 7 can be made to pivot to the lower limit as well.

Note that the protuberance 83 formed on an outer wall surface of the stand wall 81 and the inner wall surface of the raised wall 23 of the resin cover 2 constantly press each other. A frictional force due to contact is generated between the two. Thereby, when the arm 7 is at any position within the operation range of the arm 7, if a seated person removes his arm from the arm 7, the arm 7 never falls, horizontally deflects or rattles.

As described above, the armrest 1 according to the present embodiments includes the arm 7, the arm body 4 including the base 45 at which the through hole 43 is formed, and the drum 3 that is inserted in the through hole 43 and includes the planar walls 31. In the armrest 1, the cylinder 32 of the drum 3 is inserted in the through hole 43 of the arm body 4, and the planar walls 31 of the drum 3 contact the rim 44 of the through hole 43. Moreover, the cylinder 32 of the drum 3 is locked into the mounting metal fittings 8, and the cylinder 32 and the planar walls 31 of the drum 3 sandwich the arm body 4. Thereby, even when a horizontal force applies to the arm 7, the planar walls 31 of the drum 3 strongly hold the rim 44 of the arm body 4, and the arm 7 never horizontally inclines. Moreover, the planar walls 31 of the drum 3 are disposed at positions corresponding to the front and rear in the longitudinal direction of the arm 7 so that, in the present embodiments, a weight of the armrest 1 can be reduced.

In the conventional armrest including a spring lock mechanism, as described above, the arm has been provided with the ring as an element for fixing the coil spring to the arm. Further, a fixed end side of a coil has been wound several times (for example, twice to three times) around the ring, thereby offsetting a part of a tensile force to the coil spring. Moreover, a tip end of the wound coil spring has been fixed to the arm. The plural windings of the coil around the ring at the fixing element has been performed by windings (for example, four times) of the coil for ensuring a required lock force and further windings simply added thereto, which has been one of the causes of an obstacle to reduction in size and weight of the armrest.

In contrast, in the present embodiments, the fixed end 51 of the coil spring 5 is folded into a Z-shape, and inserted in the T-shaped groove 61 so as to be fixed. Consequently, in the armrest 1 according to the present embodiments, the arm 7 does not include a ring around which the coil is wound. Moreover, the coil spring 5 is not wound to fix the coil spring to the arm. Thus, the size and weight of the armrest 1 can be reduced. For example, the armrest 1 can be thinned.

Moreover, the folded claws 87 of the mounting metal fittings 8 for mounting the armrest 1 on the seat frame are located sufficiently distant from the center of the through hole 86 into which the mounting bolt (fastener) is inserted. Thereby, a load (torque) applying to the arm 7 is reasonably received. Moreover, similarly, the stopper contact portions 82A, 82B of the mounting metal fittings 8 and the internal stoppers 41 of the arm body 4 are also arranged sufficiently distant from the mounting bolt. Consequently, in the present embodiments, loosening of the mounting bolt is unlikely to occur. Thereby, a member for preventing loosening of the mounting bolt, such as washer, is unnecessary. Moreover, the arm body 4 is provided with the banks 49A, 49B and the internal stoppers 41, and the arm body 4 is fitted in the arm 7. Consequently, the section modulus increases, and the strength of the armrest 1 in a cross-section direction (horizontal direction) and in the longitudinal direction is enhanced. According to the present embodiments, the weight of the armrest 1 can be reduced. Moreover, the planar walls 31 of the drum 3 are arranged at front and rear positions corresponding to the front and rear in the longitudinal direction of the arm 7. Thereby, according to the present embodiments, increase in weight of the drum 3 can be suppressed. Moreover, the planar walls 31 of the drum 3 together with the arm body 4 hold the base 77 of the arm 7 so that the horizontal strength of the armrest 1 is improved. These configurations allow the armrest 1 to satisfy horizontal strength standards (for example, 980 N) required in view of safety. Moreover, reduction in size and weight of the armrest 1 can be performed (for example, the arm 7 can be also made of a steel plate having a thickness of 0.6-0.8 mm which is significantly thin in comparison with a conventional product having a thickness of 1.6 mm).

The arm 7 is disposed between the arm body 4 and the mounting metal fittings 8. Even if the arm 7 is made of metal, as long as the arm body 4 is made of a material other than metal (for example, resin), the protrusions 42 of the arm body 4 may protrude out of the arm body insertion holes 76, which never causes metals to directly contact each other. Consequently, applying a grease to the armrest 1 is unnecessary. Moreover, metals are never seized and unusual sounds are never generated.

Although embodiments of the present disclosure has been described, the present disclosure is not to be limited to the above embodiments, and the like. For example, in the above embodiments, an embodiment including the spring lock mechanism comprising the drum 3 and the coil spring 5 has been described. However, this is merely one embodiment of the present disclosure. For example, the present disclosure can also apply to the armrest 1 comprising the arm body 4, the drum 3 and the mounting metal fittings 8. Specifically, the present disclosure can also apply to the armrest 1 that fails to include the coil spring 5. In this case, members other than the coil spring 5 and the holder plate 6 can be commonly used between the armrest 1 that includes the coil spring 5 and the armrest 1 that fails to include the coil spring 5, and common use of components between the two can be designed.

In the above embodiments, the armrest 1 includes the holder plate 6 having a function of fixing the fixed end 51 of the coil spring 5 and reinforcing the external stoppers 75A, 75B of the arm 7. However, the present disclosure is not limited to this. In the present disclosure, when the function of reinforcing the external stoppers 75A, 75B of the arm 7 is unnecessary, the fixed end 51 of the coil spring 5 may be fixed to the arm 7 itself in place of the holder plate 6.

In the above embodiments, the stopper contact portions 82A, 82B comprise both the ends of the circular arc stand wall 81 of the mounting metal fittings 8. Moreover, end surfaces of both these ends contact the corresponding internal stoppers 41 and the corresponding external stoppers 75A, 75B. However, the present disclosure is not limited to this. For example, as illustrated in FIG. 4C, both the ends of the stand wall 81 are substantially vertically folded toward an inner wall side, and these folded portions may form corresponding planar stopper contact portions 82C, 82D. Thereby, an area in contact with the external stoppers 75A, 75B that are mate members increases, and the strength of the external stoppers 75A, 75B per unit area can be largely decreased. Consequently, the holder plate 6 can be omitted, and reinforcing an inner side of the external stoppers 75A, 75B only by the arm body 4 is enabled. As a result, the armrest 1 can be thinned.

Note that a term of each member is provided for convenience to easily understand configurations according to the disclosure. For example, the resin cover 2 may be ordinarily simply called cover, and the mounting metal fittings 8 may be simply called mounting fittings. Moreover, the raised ring 36 may be called lock.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An armrest that is used while being fixed on a seat frame through a fastening bolt, the armrest comprising:
   an arm body comprising a front portion and a rear portion and having a first through hole formed in the rear portion;
   an arm comprising a base and an arm portion, the arm having a recess in which the arm body is located, the arm portion extending in a forward direction from the base;
   a drum that includes a cylinder inserted in the first through hole, a bottom, and circular arc planar walls extending radially outward from an external circumferential surface of the cylinder, is arranged at the rear portion of the arm body, and pivots the arm body about the cylinder; and
   mounting metal fittings that are integrally connected to the bottom of the drum and can be mounted on the seat frame; wherein
   the armrest comprises an adjustment mechanism for adjusting a position of the arm between a storage state in which the arm portion of the arm is pivoted upward and a use state in which the arm portion of the arm is pivoted downward,
   wherein the circular arc planar walls each have a radial direction length of 10% or more of a length of the arm and a width in a circumferential direction of three times or more as large as a thickness of the cylinder, the circular arc planar walls being arranged in a front-and-rear direction of the arm body in the use state, and the arm body is sandwiched between the circular arc planar walls and the mounting metal fittings in an axial direction of the cylinder.

2. The armrest of claim 1, wherein:
   in the bottom of the drum, a second through hole into which the fastening bolt fastened with the seat frame can be inserted, a raised ring that is raised toward the mounting metal fittings, and locks that surround the raised ring are formed,
   the mounting metal fittings comprise a plate in which a raised ring insertion hole into which the raised ring is inserted is formed, and, on one surface of the plate, locked portions that fit in the corresponding lock are formed, and, on the other surface of the plate, folded claws each having a tip end that is folded are formed,
   with respect to the drum, while the locks and the locked portions are locked one-to-one into each other, and the raised ring is inserted in the raised ring insertion hole, a tip end of the raised ring is folded outside the raised ring insertion hole and an outer diameter of the tip end is spread out further than the raised ring insertion hole so that the drum is integrally connected to the mounting metal fittings, and
   with respect to the plate, the folded claws lock into corresponding insertions holes provided in the seat frame and the fastening bolt inserted in the second through hole is fastened so that the plate can be mounted on the seat frame.

3. The armrest of claim 1, wherein:
   the adjustment mechanism comprises a spring lock mechanism comprising:
      the drum that includes a rewind cam and a restoration cam for a coil spring and is mounted on the seat frame through the mounting metal fittings;
      the arm that integrally connects the arm body and integrally pivots about the drum while fixing the coil spring;
      the coil spring that includes a fixed end folded outside and a free end folded inside, wherein the fixed end is fixed to the arm, and an inner diameter is smaller than a diameter of the drum in a free state in which the coil spring is wound around the drum; and
      the arm body that includes a lock wall and a lock auxiliary cam for the coil spring, is inserted with the coil spring, and is integrally connected to the arm, the spring lock mechanism regulating downward pivot of the arm while allowing upward pivot of the arm
   wherein, when the arm pivots upward from the use state to an upper limit position within an adjustment range, the free end of the coil spring comes into contact with the rewind cam of the drum to loosen fastening of the coil spring, and then the free end of the coil spring comes into contact with the lock auxiliary cam of the arm body, and moves to the lock wall to be locked so that a lock release state in which vertical pivot of the arm can be freely performed is enabled, and
   when the arm pivots downward out of the lock release state to a lower limit position within the adjustment range, the free end of the coil spring comes into contact with the restoration cam to be released from the lock wall so that a lock state in which vertical pivot of the arm is regulated is restored.

4. The armrest of claim 3, wherein the cylinder includes a chipped portion formed in a cylindrical cross section thereof.

5. The armrest of claim 1, further comprising a cover that covers the arm body, the base of the arm, and the mounting metal fittings,
   wherein the mounting metal fittings include a plate that is locked into the bottom of the drum, a circular arc stand wall formed on an outer rim of the plate, and a protuberance that is formed on an outer wall surface of the stand wall,
   the cover includes a circular arc raised wall that is raised from a portion covering the planar walls and extends toward an outer wall side of the stand wall of the mounting metal fittings to contact the protuberance, and
   when the arm body pivots about the cylinder, the protuberance and the raised wall brake the pivot and prevent deflection, rattling, or downward fall of the arm body.

6. The armrest of claim 1, wherein the mounting metal fittings include a plate that is locked into the bottom of the drum, a circular arc stand wall formed on an outer rim of the plate, and planar stopper contact portions connected to the plate, and the arm body and the arm are integral.

* * * * *